Feb. 4, 1969 B. L. WELLER 3,426,267

VARIABLE RESISTOR-CAPACITOR UNIT

Original Filed Nov. 16, 1964

INVENTOR.
Barton L. Weller
BY
Johnson and Kline
ATTORNEYS 3,426,267
VARIABLE RESISTOR-CAPACITOR UNIT Barton L. Weller, Monroe, Conn., assignor to Vitramon, Incorporated, Monroe, Conn., a corporation of Delaware Continuation of application Ser. No. 411,258, Nov. 16, 1964. This application Jan. 18, 1968, Ser. No. 698,988
U.S. Cl. 323—74 7 Claims
Int. Cl. H02p *13/00;* H02m *3/04, 5/06*

ABSTRACT OF THE DISCLOSURE

A variable resistor-capacitor unit to selectively adjust an electrical circuit. Capacitor plates are embedded within dielectric materials while a resistive path is disposed on a surface of the dielectric. Both the resistor and capacitor are variable and can be connected in series or in parallel with each other.

This application is a continuation of application Ser. No. 411,258, filed Nov. 16, 1964, now abandoned.

It is often necessary in the application of electrical circuits to provide means in the circuit for accurately and selectively adjusting the circuit to achieve a desired end; in semiconductor circuits for controlling power, as in light dimmers, for example, means must be provided for adjusting the circuit to increase or decrease illuminating intensity of the controlled light.

It is a primary object of the present invention, therefore, to provide an electrical circuit component which is readily adjustable for varying its relative electrical values, whereby a circuit into which it is incorporated is controlled.

It is also an object of the invention to provide a capacitor-resistor network component for controlling an electrical circuit wherein the relative RC values of the network are readily adjustable.

It is also an object of the invention to provide a capacitor-resistor network component, wherein the capacitor and/or resistor elements of the network are accurately selectively adjustable for controlling an electrical circuit.

Another object of the invention is to provide a relatively small compact RC network component formed of monolithic elements, which is readily adjustable for varying the RC values thereof for controlling an electrical circuit.

Still another object of the invention is to provide an adjustable RC network component comprising an assembly of juxtaposed relatively movable monolithic elements cooperative to provide the variable capacitor and resistor units thereof.

It is further an object of the invention to provide an adjustable capacitor-resistor component including a plurality of monolithic elements assembled in juxtaposed relation and movable relative to one another, one of the elements being common to both the capacitor and resistor portions of the component, the common element having a capacitor plate embedded therein and having a resistive path of predetermined length on a surface thereof, the other elements having means cooperating with the capacitor plate and resistive path to form the capacitor and resistor respectively and being movable relative to the common element for selectively adjusting the capacitor and resistor portions of the component for controlling the circuit in which it is incorporated, the capacitor and resistor being electrically connected in a predetermined manner.

It is still further an object of the invention to provide an adjustable RC network component, that embodies the characteristics of prior fixed capacitor and resistor components, and which is readily manufactured by quantity production methods, is accurately adjustable and is of such rugged character it will function over a long period of time with freedom from all difficulties.

Other objects and advantages of the invention will be apparent from the specification and claims, when considered in connection with the attached sheet of drawings, illustrating one form of the invention, wherein like characters represent like parts and in which:

Figures 1, 2, 3, 4, 5, 6, 7, 8, 9:
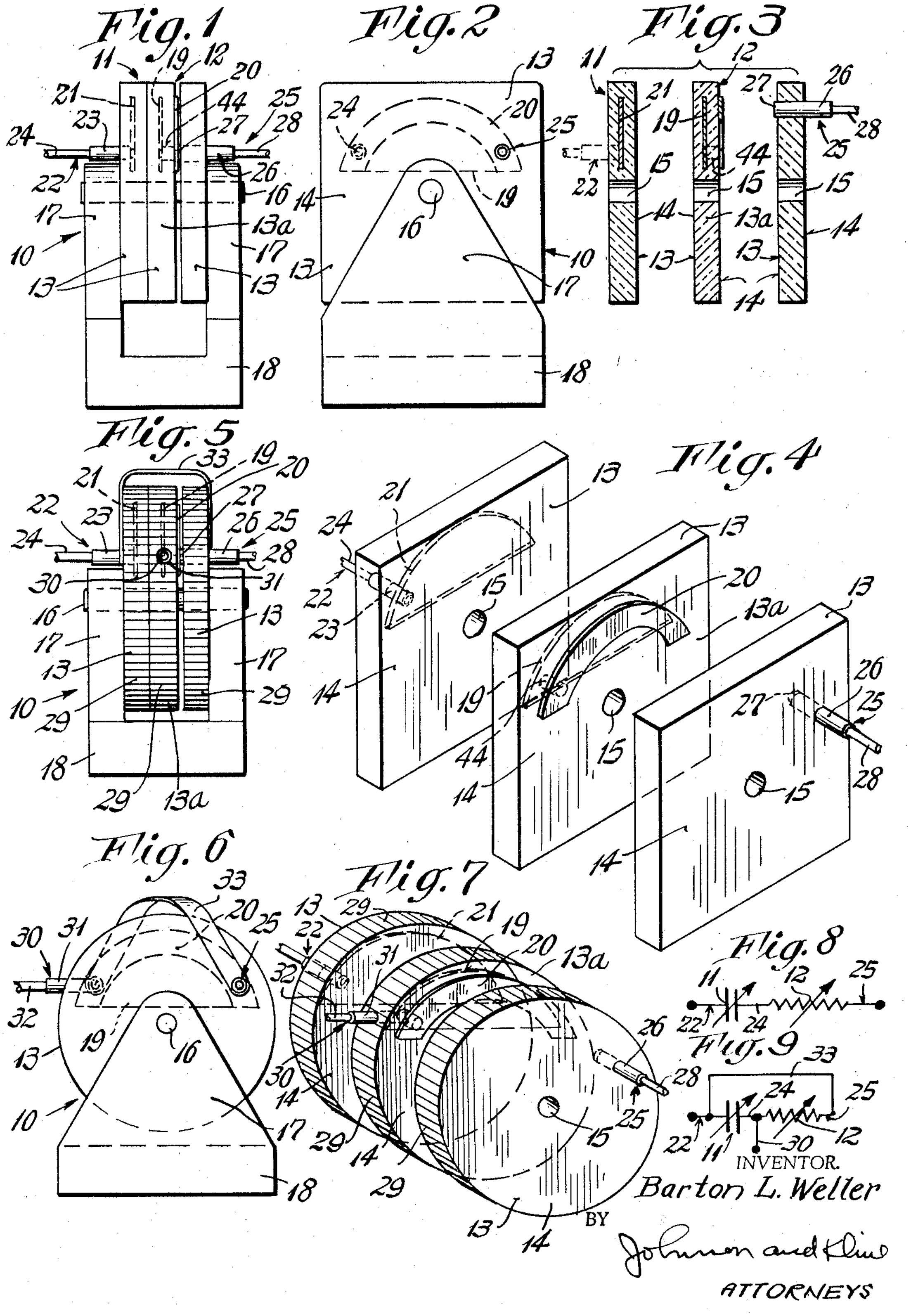
FIGURE 1 is a front elevational view of a variable capacitor-resistor component according to the invention.
FIG. 2 is a side elevational view of the component of FIG. 1.

FIG. 3 is an exploded cross-sectional view of the movable elements of FIG. 1, in which element 13 carrying the terminal means 25 is shown rotated about 90° relative to the resistive means;

FIG. 4 is an exploded perspective view of the movable elements of FIG. 1;

FIG. 5 is a front elevational view of a modified form of variable capacitor-resistor component according to the invention;

FIG. 6 is a side elevational view of the component of FIG. 5;

FIG. 7 is an exploded perspective view of the movable elements of the component of FIG. 5;

FIG. 8 is a schematic sketch of the electric circuit embodied in the component of FIG. 1; and FIG. 9 is a schematic sketch of the electric circuit embodied in the component of FIG. 5.

Referring now to the drawings for a more detailed description of the invention, in FIGS. 1 through 4 an adjustable capacitor-resistor (RC network) component 10 embodying the concepts of the invention, is shown including, as generally indicated, a capacitor unit 11 and a resistor unit 12, the units being individually selectively adjustable for controlling a circuit into which the component is connected.

As illustrated, the component comprises a plurality of independent monolithic elements 13 relatively movably assembled in juxtaposed relation for forming the capacitor and resistor units 11 and 12, the element 13*a* of the assembly being common to both units, as will be hereinafter explained, and being disposed between at least two of the other elements 13. It should here be noted that, while the component 10 is shown to include only three elements 13, a greater number of such elements may be included in the assembly, as will be readily appreciated by those conversant with the art.

The monolithic elements 13, which may be formed of porcelain, ceramic or similar dielectric materials, preferably are each in the form of a relatively thin body having opposed, parallel, flat major surfaces 14, the facing major surfaces of adjacent elements in the assembly being parallel and predeterminately spaced relative to one another. While the elements 13 may be relatively movably assembled in juxtaposed relation in any known manner, in the herein illustrated form of the invention the elements are each formed with a substantially central aperture 15, the apertures in the assembled relation of the elements being axially aligned to provide a bore for receiving a shaft 16 upon which the elements are mounted. The shaft 16 is carried between the spaced arms 17 of a bracket 18, the bracket preferably being formed of resilient material so that the arms 17 thereof exert a compressing force against the elements 13 to retain them in any given relative relationship.

The common element 13*a* of the assembly is formed with at least one electrically conductive capacitor plate 19 embedded therein, the plate being preferably located wholly at one side of the rotatable axis of the element, as clearly seen in the drawings. An arcuate path 20 of resistive material is formed on one of the major surfaces of common element 13*a*, the path having a predetermined resistive length and being located at one side of the rotatable axis of the element to substantially overlie the embedded capacitor plate.

In order to form the capacitor unit 11 of component 10, one of the elements 13, adjacent and in surface-to-surface contact with the common element 13*a*, is provided with an embedded electrically conductive capacitor plate 21, similar in form and location to the capacitor plate 19 embedded in common element 13*a*, the plates 21 and 19, in the herein illustrated form of the invention, forming the opposed electrodes of the capacitor unit and being separated by the dielectric material of their respective elements 13. It will be readily understood by those conversant with the art that modifications may be resorted to in forming the capacitor unit without departing from the concepts of the invention, as by, embedding a greater number of capacitor plates in the elements than are herein shown or by adding elements having embedded capacitor plates to the assembly.

As is well known, the capacitance of a capacitor is, in part, determined by the overlapping area of opposed electrodes and it is this characteristic of a capacitor which is relied upon to enable the capacitor unit 11 to be selectively adjustable. In order to adjust the capacitor unit 11 of the component 10, as herein illustrated, it is merely necessary to relatively rotate the element 13, having the capacitor plate 21 embedded therein, and the common element 13*a*, so that the overlapping relationship of the electrode plates 19 and 21 are varied, such relative movement between complete and partial overlap of the electrode plates adjusting the capacitor unit from maximum capacitance to minimum capacitance respectively.

The resistor unit 12 of the component 10 is formed by the resistive path 20 disposed on one of the surfaces of the common element 13*a*, this unit being adjustable by varying the effective length of the resistive path as will be more fully discussed hereinafter.

While the capacitor and resistor units 11 and 12, of the component embodying the present invention, may be electrically independent of one another, the component 10, shown in FIGS. 1 through 4, embodies a series electrical connection between the capacitor unit 11 and the resistor unit 12, as schematically shown in FIG. 8. In order to obtain the desired series connection the electrode plate 21 of the capacitor unit is provided with a terminal means 22 for connecting one side of the component 10 into an electrical circuit. While the terminal means 22 may be formed by electrically communicating the capacitor plate 21 outwardly of the body of element 13 in any manner known to the art, in the herein illustrated and preferred form of the invention the terminal means is provided by embedding an electrically conductive sleeve 23 in the element 13 so that it has electrical engagement with the capacitor plate 21 and extends outwardly of a major surface 14 of the element. This sleeve may itself constitute the terminal means or a lead wire 24 may be inserted therein to provide the desired connection into the electrical circuit.

The opposite electrode of the capacitor unit 11, as herein represented by the capacitor plate 19, is electrically connected to one side of the resistor unit 12 by means 44 embedded in the element 13*a* and extending between the capacitor plate 19 and one end of the resistive path 20. While the means 44 may be in the form of any type of electrically conductive connector, in the herein illustrated form of the invention it comprises an electrically conductive sleeve similar in form to that discussed in connection with terminal means 22.

In order to complete connection of component 10 into an electrical circuit, a terminal means 25 is provided for connection to the resistor unit 12. As is well understood, the terminal means 25 is connected to the end of the resistor unit remote from the end thereof connected to capacitor unit 11 and, as herein illustrated, comprises an electrically conductive sleeve 26 extending through the element 13 adjacent the major surface 14 of common element 13*a* having the resistive path 20 thereon. The sleeve 26 is provided with means 27 at the end thereof directed toward the resistive path, which protrudes slightly beyond the surface of the element 13, for engaging the resistive path. As was discussed in connection with terminal means 22, the sleeve 26 may be utilized for connecting its side of the component 10 directly into an electrical circuit or may be provided with an inserted lead wire 28 for making such connection.

Referring again to the resistor unit 12, it will be seen that the effective length of the resistive path forming such unit is defined by the distance between the means 44, connecting an end of the resistive path to the capacitor plate 19, and the path engaging end 27 of the terminal means 25. In order to adjust the resistor unit 12 to obtain a desired resistor value it is merely necessary to relatively rotate the element 13, carrying the terminal means 25, and the common element 13*a* so that the end 27 of the terminal means traverses the resistive path 20 to shorten or lengthen it as required.

It will be apparent that by means of the component construction above described, an electrical device is provided which may readily be adjusted for controlling an electrical circuit by varying the value of the capacitor and/or the resistor unit thereof.

Referring now to FIGS. 5 through 7 of the drawings, a modified form of component 10 is illustrated which differs only slightly in construction from that discussed above in connection with FIGS. 1 through 4. In this embodiment of the invention the elements 13 are in the form of disks and have their peripheral edges serrated or similarly roughened as at 29, to facilitate the relative movement of the elements.

In the component 10 of FIGS. 5 through 7, the capacitor unit 11 and the resistor unit 12 are electrically connected in parallel, as schematically illustrated in FIG. 9. Such a connection being achieved by merely adding to the series connections discussed in relation to the component of FIGS. 1 through 4 as will be described in the following sentences. As shown, the parallel connection is obtained by providing a terminal means 30 for directly connecting the electrode or capacitor plate 19 and one end of the resistor path 20 into the electrical circuit. Similar to the terminal means 22 and 25, the terminal means 30 may be formed in any known manner or, as herein illustrated, may comprise an electrically conductive sleeve 31 embedded in the element 13*a* in engagement with the plate 19 and therethrough with the resistor path for communicating them outwardly of the body of the element. The terminal means may include a lead wire 32, received in the sleeve, for making the ultimate connection into the circuit. The parallel connection is completed by electrically connecting or tying together the component terminals 22 and 25 for providing through one of such terminals, the second connection into the electrical circuit. The connection of the terminals 22 and 25 is achieved by means of an electrically conductive strap 33 extending around the assembled elements 13 into electrical connection with the terminals. It will be understood that, in order to enable the elements 13 of the component to be relatively moved for adjusting the capacitor or resistor units, the strap 33 must be so formed as to permit the required movement of the elements.

Thus, among others, the several objects and advantages of the invention as aforenoted are achieved. Obviously numerous changes in the structure may be resorted to without departing from the spirit of the invention as defined by the claims.

I claim:

1. An adjustable electrical component having a capacitor unit and a resistor unit for controlling an electrical circuit, said component comprising a first and a second set of outer members, each of said sets having at least one substantially flat monolithic body member, said first and second set of outer members being assembled in spaced relation to one another, said body members being formed of dielectric material, and an inner member intermediate to said first and second sets, said inner member having an electrically conductive capacitor plate embedded therein and having an electrically resistive path of predetermined length formed on a surface thereof, said path having a portion thereof electrically connected to said embedded capacitor plate, at least one body member of said first set having at least one electrically conductive capacitor plate embedded therein in parallel relation and substantially opposite to the capacitor plate in said inner member for forming said capacitor unit, said body member being movable relative to said inner member for controlling the relative positions of said capacitor plates so that said capacitor unit is selectively variable, at least one body member of said second set having a terminal means in electrical communication with the resistive path on said inner member, said second set body member being movable relative to said inner member so that said terminal means traverses said resistive path toward and away from the portion thereof electrically connected to the capacitor plate of said inner member for controlling the length of said resistive path so that said resistor unit is selectively variable, and terminal means communicating outwardly from at least one body member of said first set whereby said capacitor and resistor units are connected in series for connection into an electrical circuit.

2. An adjustable electrical component including a capacitor unit and a resistor unit for controlling an electrical circuit, said component comprising a first and a second set of outer members, each of said sets having at least one substantially flat monolithic body member, said first and second set of outer members being assembled in spaced relation to one another, said members being formed of dielectric material, and an inner member intermediate to said first and second sets, said inner member having an electrically conductive capacitor plate embedded therein and having an electrically resistive path of predetermined length formed on the surface thereof, said path having a portion thereof electrically connected to said embedded capacitor plate, at least one body member of said first set having at least one electrically conductive capacitor plate embedded therein in parallel relation and substantially opposite to the capacitor plate in said inner member for forming said capacitor unit, said body member being movable relative to said inner member for controlling the relative positions of said capacitor plates so that said capacitor unit is selectively variable, at least one body member of said second set having a terminal means in electrical communication with said resistive path on said inner member, said second set body member being movable relative to said inner member so that said terminal means traverses said resistive path toward and away from the portion thereof electrically connected to the capacitor plate of said inner member for controlling the length of said resistive path so that said resistor unit is selectively variable, first terminal means communicating outwardly of said capacitor plate in said inner member, second terminal means communicating outwardly from at least one body member of said first set, and means electrically connecting said resistor terminal means and said second terminal means, whereby said capacitor and resistor units are connected in parallel for connection into an electrical circuit.

3. An electrical component including a capacitor unit and a resistor unit for controlling an electrical circuit, at least one of said units being variable, said component comprising at least three elements assembled in juxtaposed relation, said elements each being in the form of a monolithic dielectric body having opposed parallel planar major surfaces, one of said elements being intermediate said capacitor and resistor units, said elements in the assembled relation thereof being positioned so that adjacent planar surfaces are parallel and said intermediate element is disposed between at least two of said other elements, said intermediate element having at least one electrically conductive capacitor plate embedded therein substantially parallel to the planar surfaces thereof and having an electrically resistive path of predetermined length formed on one of the planar surfaces thereof, said other elements having means cooperating with said capacitor plate and said resistive path for providing said capacitor and resistor units respectively, at least one of said other elements being movable relative to said intermediate element for selectively adjusting at least one of said capacitor and resistor units for varying the component, and means for electrically connecting said capacitor plates and resistive path to said intermediate member in a predetermined manner for electrically connecting said units, wherein a portion of the resistive path is electrically connected to the capacitor path embedded in said intermediate element and in which the one of said other elements disposed adjacent the planar surface of the intermediate element having the resistive path thereon is provided with terminal means in electrical engagement with said resistive path.

4. An adjustable electrical component having a capacitor unit and a resistor unit for controlling an electrical circuit, said component comprising a first and a second set of outer members, each of said sets having at least one substantially flat body member, the first and second sets of outer members being assembled in spaced relation to one another; and an inner member intermediate to the first and second outer sets and having at least one electrically conductive capacitor plate associated therewith and an electrically resistive path of predetermined length formed on a surface thereof, the electrically resistive path having at least a portion thereof electrically connected at least one of the capacitor plates associated with the inner member; at least one body member of said first set having at least one electrically conductive capacitor plate associated therewith, the capacitor plate of the body member of the first set being in parallel relation to the capacitor plate of the inner member for forming with the capacitor plate of the inner member the capacitor unit, the body member and the inner member being movable relative to each other for controlling the relative positions of the capacitor plates so that the capacitor unit is selectively variable; at least one body member of said second set having a first terminal means in electrical communication with the resistive path on the inner member, the second set body member and the inner member being movable relative to each other so that the first terminal means traverses the resistive path toward and away from the portion thereof electrically connected to the capacitor plate of the inner member for controlling the length of the resistive path so that said resistor unit is selectively variable.

5. An adjustable electrical component as described in claim 4 further comprising second terminal means communicating outwardly from at least one body member of the first set, whereby the capacitor and resistor units are connected in series.

6. An adjustable electrical component as described in claim 4 further comprising second terminal means communicating outwardly from at least one body member of said first set, third terminal means communicating outwardly of the capacitor plate associated with the inner member and means electrically connecting the first terminal means and the second terminal means, whereby the capacitor and resistor units are connected in parallel.

7. An electrical component including a capacitor unit and a resistor unit for controlling an electrical circuit, at least one of said units being variable, said component comprising at least three elements assembled in juxtaposed relation with at least one of said elements disposed intermediately between at least two other of said elements, the intermediate element having at least one electrically conductive capacitor plate associated therewith and an electrically resistive path of predetermined length formed on a surface thereof; said other elements having means cooperating with the capacitor plate and the resistive path of the intermediate element for providing the capacitor and resistor units respectively; at least one of the other elements being movable relative to the intermediate element for selectively adjusting at least one of the capacitor and resistor units for varying the component; means for electrically connecting at least one of the capacitor plates of the intermediate element and the resistive path of the intermediate element in a predetermined manner for electrically connecting the capacitive and resistive units; and terminal means on one of the other elements disposed adjacent the surface of the intermediate element having the resistive path thereon, the terminal means electrically contacting the resistive path.

References Cited

UNITED STATES PATENTS

| | | | |
|---|---|---|---|
| 1,663,166 | 3/1928 | Jones | 323—74 |
| 2,159,754 | 5/1939 | Wohlfarth | 323—76 X |
| 2,185,870 | 1/1940 | Smith. | |
| 2,940,035 | 6/1960 | Lefkowitz | 323—74 |
| 3,176,217 | 3/1965 | Matsushima et al. | 323—78 |
| 3,202,889 | 8/1965 | Matsui. | |
| 3,244,951 | 4/1966 | Wallace. | |

FOREIGN PATENTS

| | | |
|---|---|---|
| 764,965 | 6/1954 | Germany. |

LEE T. HIX, *Primary Examiner.*

A. D. PELLINEN, *Assistant Examiner.*

U.S. Cl. X.R.

317—249, 256; 323—93